J. M. McCARTHY.
Brick Kiln.
2 Sheets—Sheet 2.
No. 113,185. Patented March 28, 1871.
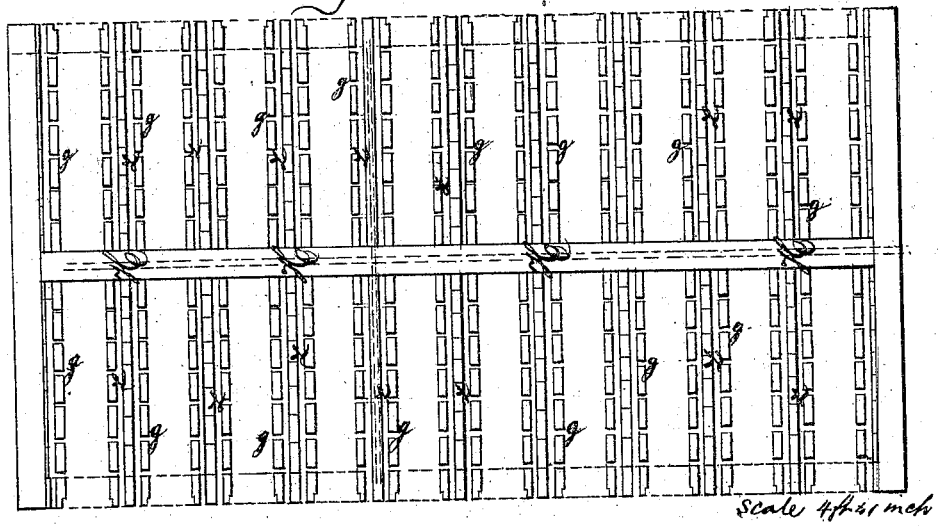

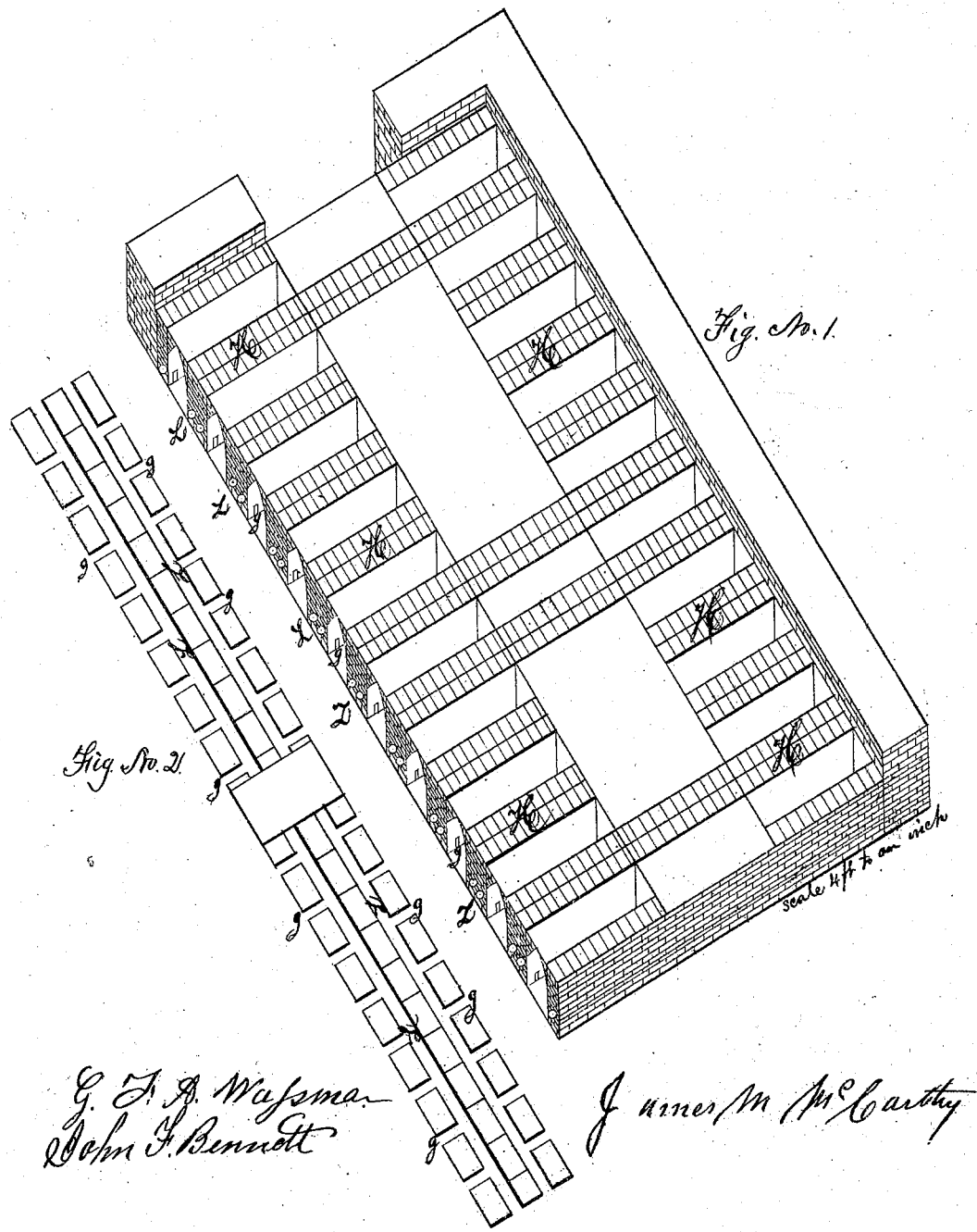

United States Patent Office.

JAMES M. McCARTHY, OF CANAL DOVER, OHIO.

Letters Patent No. 113,185, dated March 28, 1871.

IMPROVEMENT IN BRICK-KILNS.

The Schedule referred to in these Letters Patent and making part of the same.

*To all whom it may concern:*

Be it known that I, JAMES M. MCCARTHY, of Canal Dover, in the county of Tuscarawas and State of Ohio, have invented certain new and useful Improvements in Brick-Kilns; and I do hereby declare the following to be a full, clear, and exact description thereof, reference being had to the accompanying drawing and to the letters of reference marked thereon.

The nature of my invention consists in the construction and arrangement of hollow benches for brick-kilns, as will be hereinafter more fully set forth.

In order to enable others skilled in the art to which my invention appertains to make and use the same, I will now proceed to describe its construction and operation, referring to the annexed drawing which forms a part of this specification, and in which—

Figure 1 is a perspective view, showing the kiln with arches and benches;

Figure 2 is an enlarged foundation-plan of a bench; and

Figure 3 is a foundation-plan of a kiln.

H H represent raised benches made of brick, cast-iron, or any other suitable material. These benches are arranged, as shown in the drawing, either so as to leave a passage through the center of the kiln, or they may run entirely across the kiln, the spaces between said benches forming the furnaces.

In the sides of the benches H H are formed inlets $g$ $g$, leading into flues L L, which pass the entire length of the benches, thus making the benches entirely hollow.

The inlets $g$ $g$ admit the heat into the benches, which retain it, and thus cause the brick placed above the benches to be burned more evenly and better than is usually the case.

The flues L L admit air for combustion, and may also be used when necessary for cooling. These flues may readily be stopped up to cut off the draught by any suitable means.

Having thus fully described my invention,

What I claim as new, and desire to secure by Letters Patent, is—

1. A series of hollow benches, arranged as shown and described, the spaces between the same forming the furnaces of the kiln, as herein set forth.

2. The benches H H, made of brick, iron, or other suitable material, and provided with flues L L and inlets $g$ $g$, substantially as and for the purposes herein set forth.

J. M. McCARTHY.

Witnesses:
   J. F. BENNETT,
   G. F. A. WASSMAN.